United States Patent [19]
Saito

[11] Patent Number: 5,573,149
[45] Date of Patent: Nov. 12, 1996

[54] STORETANK FOR POWDER SUPPLY AND POWDER COATING EQUIPMENT WITH STORETANK FOR POWDER SUPPLY

[75] Inventor: Eiji Saito, Tokyo, Japan

[73] Assignee: Ransburg Industrial Finishing K.K., Tokyo, Japan

[21] Appl. No.: 410,618

[22] Filed: Mar. 24, 1995

[30] Foreign Application Priority Data

Apr. 1, 1994 [JP] Japan .................................. 6-065234

[51] Int. Cl.$^6$ ...................................................... B67D 5/00
[52] U.S. Cl. ......................... 222/636; 222/152; 222/239; 222/367
[58] Field of Search ....................................... 222/152, 196, 222/217, 239, 240, 263, 345, 367, 333, 564, 636, 637, 282, 529; 406/63, 62, 67, 68, 135; 239/704, 707

[56] References Cited

U.S. PATENT DOCUMENTS

| | | | |
|---|---|---|---|
| 2,314,031 | 3/1943 | Colburn | 406/63 |
| 3,076,580 | 2/1963 | Heath | 406/63 |
| 3,161,442 | 12/1964 | Reed | 406/63 |
| 3,201,001 | 8/1965 | Roberts et al. | 222/217 |
| 4,681,484 | 7/1987 | Egger | 406/63 |
| 4,747,524 | 5/1988 | Krambock | 222/636 |
| 5,094,403 | 3/1992 | Tschumi | 222/636 |

FOREIGN PATENT DOCUMENTS

| | | |
|---|---|---|
| 4-225855 | 8/1992 | Japan . |
| 4-371249 | 12/1992 | Japan . |

*Primary Examiner*—Andres Kashnikow
*Assistant Examiner*—Philippe Derakshani
*Attorney, Agent, or Firm*—Schwartz & Weinrieb

[57] ABSTRACT

A storetank for a powder supply is disclosed which is capable of discharging the powder particles stored therein in a constant amount without the caking and blocking of the powder particles by a method different from the conventional method. The storetank according to the present invention is comprised of a tank for storing powder particles which has a substantially cylindrical side wall and a bottom portion, a powder outlet for discharging the powder particles which is provided at the lower end portion of the side wall of the tank, a plurality of vanes disposed radially on the bottom portion of the tank and equally spaced with respect to each other about the center axis of the tank, a rotary driving mechanism for rotating the vanes about the center axis of the tank, a canopy which extends from the vicinity of the outlet toward the inside of the tank and covers the space between two of the vanes located next to each other when the space is opposite the powder outlet, and an air ejection port which is disposed within the tank and ejects air toward the space opposite the powder outlet.

20 Claims, 8 Drawing Sheets

STORETANK FOR POWDER SUPPLY AND POWDER COATING EQUIPMENT WITH STORETANK FOR POWDER SUPPLY

TECHNICAL FIELD

The present invention relates to a storetank comprising a powder supply which discharges powder particles stored therein in a constant amount, and powder coating equipment operatively associated with the storetank powder supply.

BACKGROUND OF THE INVENTION

A storetank supplying powder which discharges powder particles contained therein in a constant amount is widely used in powder coating epuipment as can be found in, for example, Japanese Patent Disclosure Heisei 4-371249. Briefly explaining the storetank described therein, the tank has a separating wall disposed at a distance above a floor surface and is separated thereby into a first chamber and a second chamber thereby on its left and right, respectively. The first chamber is adapted for fluidizing the powder particles therein by ejecting air from its floor surface. The second chamber is a settling chamber in which the powder particles transported from the first chamber are left to settle, thereby removing air mixed with the powder particles. The storetank is provided with equipment, such as a screw type transporting apparatus, which forces the delivery of the powder particles within the settling chamber to the outside of the chamber.

As for other types of storetanks for the supply of powder, a venturi type of system which ejects the powder particles from the tank by utilizing fluid pressure and a bin discharger type of system which ejects the powder particles by gravitational movement of the powder particles are known.

The venturi type of system is comprised of a tank for storing the powder particles in a liquidized state, a pipe for discharging the powder particles which is inserted into the tank, and a venturi mechanism connected to the pipe. It is adapted for sucking out the powder particles within the tank by utilizing negative pressure generated by the venturi mechanism. The bin discharger type of system is comprised of a tank having an outlet at an outer periphery portion of its bottom wall, a canopy positioned above the outlet of the tank, and a rotary table disposed at the center of the bottom portion of the tank. The rotary table is provided with a plurality of vanes on its outer peripheral surface, which radially extend to a side wall of the tank and which are equiangularly spaced with respect to each other. The rotary table allows the powder particles to enter into the spaces between the vanes by falling through the outlet.

This type of storetank for the powder supply has a problem of caking and blocking of powder particles, that is, aggregation of the powder particles which are discharged from the tank. If there is a clog in the discharged powder particles, it can cause subsequent clogging. With respect to this problem, although the venturi type tank described above is advantageous, a large amount of air is necessary since it is designed to fluidize all of the powder within the tank. In addition, since it is configured to suck out the powder particles within the tank by the venturi mechanism, a large amount of air is also necessary to generate a strong suction force within the venturi mechanism.

OBJECTS OF THE INVENTION

The object of the present invention is to provide a storetank comprising a powder supply which is capable of discharging the powder particles stored therein in a constant amount without the caking and blocking of the powder particles by a method different from the conventional method.

Another object of the present invention is to provide a storetank comprising a powder supply which is capable of delivering the powder particles stored therein in a constant amount with a small amount of air.

Another object of the present invention is to provide powder coating equipment having a storetank for supplying powder which is capable of delivering the powder particles stored therein in a constant amount by a method different from the conventional method.

SUMMARY OF THE INVENTION

A storetank for the supply powder, according to the present invention, essentially includes a tank for storing powder particles having a substantially cylindrical side wall and a bottom portion. A powder outlet for discharging the powder particles is provided at the lower end portion of the side wall of the tank. A plurality of vanes are radially disposed at the bottom portion of the tank and are equally spaced with respect to each other about the center axis of the tank and divide the space at the bottom portion within the tank into equal spaces. Those vanes are rotatably driven by driving means about the center axis of the tank. In the vicinity of the powder outlet within the tank, a canopy is fixedly mounted. The canopy extends along the upper edges of the vanes located next to each other and it covers a space between those two vanes when the space between those two vanes is opposite the powder outlet. An air outlet is provided within the tank and ejects air toward the space which is opposite the powder outlet.

The powder coating equipment, according to the present invention, is essentially provided with a venturi mechanism which receives the powder particles discharged from the powder outlet of the storetank for the powder supply described above and has powder coating means connected to the venturi mechanism. The powder coating means receives a supply of powder delivered by the venturi mechanism and discharges the powder particles toward an article to be coated.

In accordance with the storetank for supplying powder in accordance with the present invention, the powder particles which exist in the space between the vanes located next to each other are transported to the outlet by means of the rotation of the vanes. Since the canopy is fixedly mounted in the vicinity of the outlet, the powder particles advanced by the vanes to the location of the canopy are separated from the powder particles located above the canopy, whereby the amount of the powder particles is measured in accordance with the volume of the space between the vanes located next to each other. Furthermore, the powder particles covered by the canopy are forced to be discharged from the outlet by means of the air ejected from the air outlet.

As described above, since the amount of the powder particles is measured by means of the volume the vanes located next to each other and the canopy, and the powder particles measured are forced to be discharged by air, the powder particles within the tank can be discharged from the tank with a small amount of air while the powder is separated into individual particles by the air. Therefore, caking and blocking of the powder particles discharged from the tank can be prevented with a small amount of air. Furthermore, since the powder particles discharged from the tank are separated from the powder particles located above the canopy by the canopy provided at the powder outlet, the powder particles can be discharged in a constant amount regardless of the amount of powder particles, that is, the level of the powder particles, stored in the tank.

It is preferable that the vanes be integrally formed with the rotary table disposed at the bottom of the tank. The vanes may be disposed on the outer peripheral portion of the rotary table so that a plurality of cavities are formed thereon, so that each cavity has an equal volume and opens upwardly and at the circumference of the rotary table, and that the corners between the vanes and the rotary table are formed with a curved surface. In order to constantly supply the powder particles to such cavities, the rotary table preferably has a guide member which is disposed at the inner lower portion of the tank, extends along the center axis of the tank, and has a sloped surface extending outwardly and downwardfly. This guide member facilitates downward movement of the powder particles by the sloped surface of the side wall and guides the powder particles toward the cavities. The guide member is not limited to a conical shape and can be any shape having a sloped surface gradually extending downwardly and outwardly. Therefore, the guide member can be a polyhedron which is tapered upwardly. In order to facilitate the downward movement of the powder particles, it is preferable that the tank also has a shape whose diameter is gradually reduced downwardly. With the shape of the tank having a gradually reduced diameter and/or provision of the guide member, adhesion of the powder particles to the wall surface can be prevented.

The canopy is preferably provided with an air ejection port and an air passage leading to the air ejection port. The air ejection port ejects compressed air supplied through the air passage so that the compressed air is directed toward the furthest portion of the space opposite the powder outlet.

The tank is preferably provided with agitating means that is provided in the tank and agitates the powder particles therein. The agitating means preferably makes the density of the powder particles, located in the upper space next to the vanes, uniform. Making the density of the powder particles in the space directly above the vanes, uniform can contribute to making the density of the powder particles, entering the space between the vanes, uniform. If the agitating means is provided, the upper face of the canopy is preferably shaped so as to have a flat surface in order to avoid interference with the agitating means. The canopy with the flat upper surface allows the agitating means to pass immediately thereabove. When the canopy and the agitating means are far apart, the shape of the upper surface of the canopy can be shaped as desired and, for example, it can be shaped into a roof shape slanted in one direction or in two directions.

In accordance with the powder coating equipment of the present invention, it is possible to receive the powder supply in a constant amount and discharge the powder particles toward an article to be coated with a small amount of air without caking and blocking of the powder particles. Therefore, uniform coating can be easily accomplished.

As can be clearly understood from the description above, according to the present invention, it is possible to provide a storetank for a powder supply which is capable of discharging the powder particles, in a constant amount with a small amount of air without the caking and blocking of the powder particles, by a method different from the one conventionally used. The present invention further provides powder coating equipment which utilizes a storetank which is capable of continuously supplying the powder particles to the powder coating means in a constant amount.

BRIEF DESCRIPTION OF THE DRAWINGS

The above and other objects and advantages will become apparent from the following description when read in conjunction with the accompanying drawings, in which like reference characters designate like or corrsponding parts throughout the several views, and wherein.

DETAILED DESCRIPTION OF THE ILLUSTRATED EMBODIMENTS

The illustrated embodiments will be hereinafter described with reference to the accompanying drawings.

First Embodiment (FIGS. 1 through 6)

Figure 1:
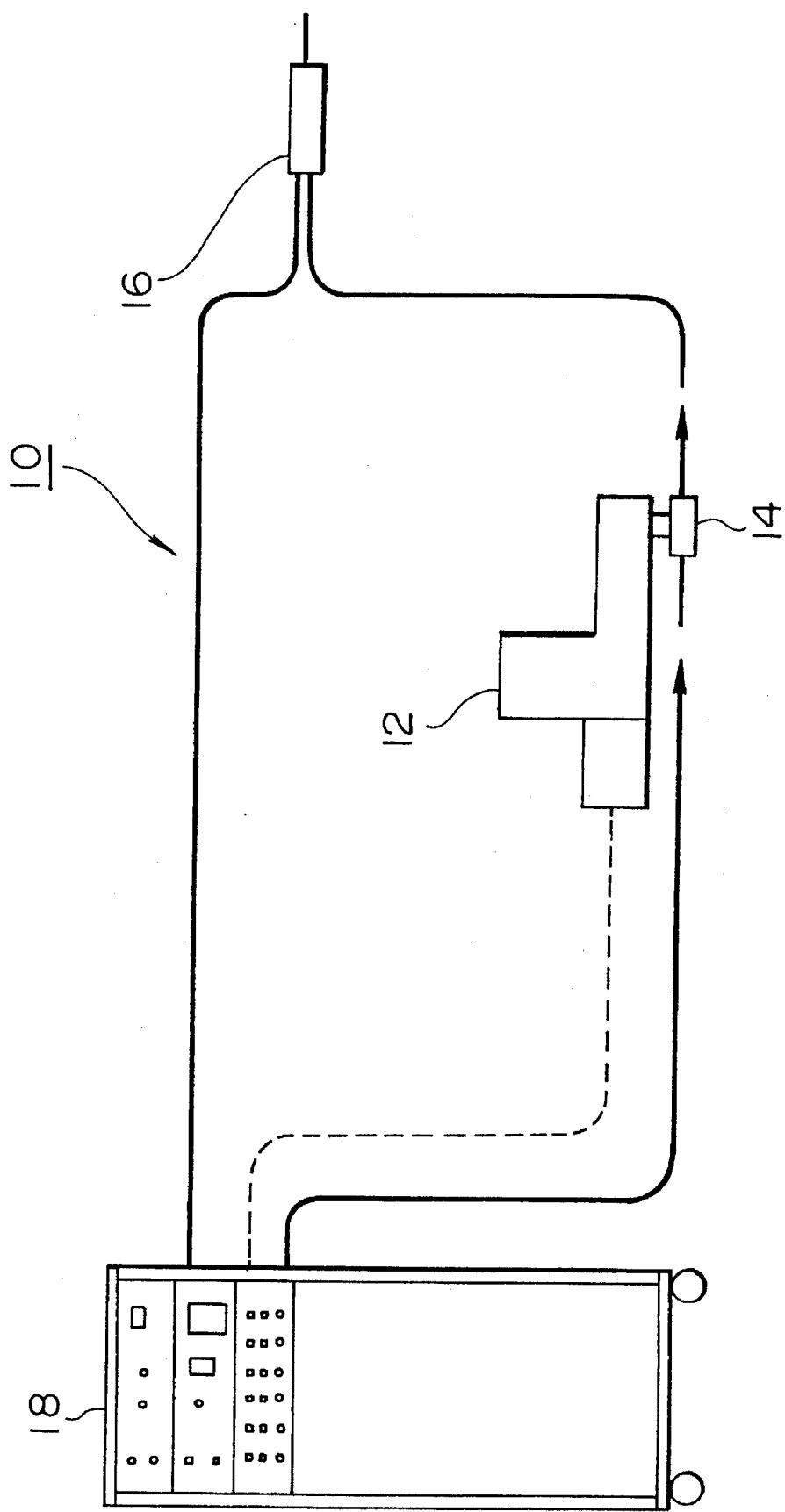
FIG. 1 is a schematic illustration of the electrostatic powder coating apparatus of an illustrated embodiment according to the present invention.

FIG. 1 is a schematic illustration of an electrostatic powder coating apparatus generally indicated by the reference character 10. The electrostatic powder coating apparatus 10 is comprised of a constant amount powder supply apparatus 12 which supplies powder particles stored therein in a constant amount, a venturi mechanism 14 provided in the constant amount powder particle supply apparatus 12, an electrostatic coating gun 16 which discharges powder particles, such as, for example, pigment, toward an article to be coated (not shown), and a controller 18 which controls the apparatus 10.

Figure 2:
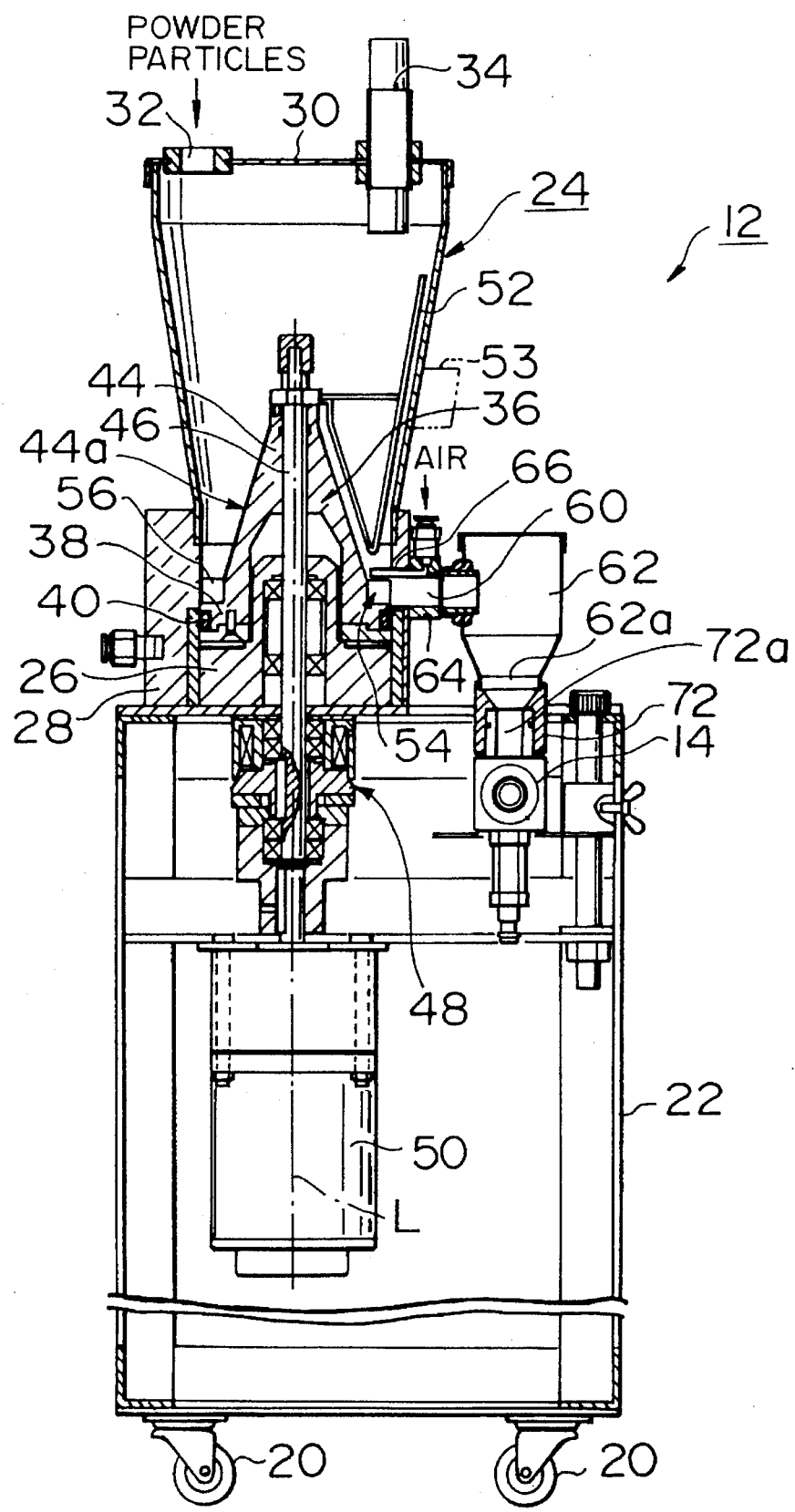
FIG. 2 is a vertical cross-sectional view of the constant amount powder supply apparatus according to the first illustrated embodiment of the present invention.

The constant amount powder particle grains supply apparatus 12, as shown in FIG. 2, includes a casing 22 provided with casters 20, and a tank 24 mounted on the casing 22. The tank 24 includes a bottom portion having a circular fixed support table 26, and a sleeve 28 into which the circular fixed table 26 is closely fitted, and the tank 24 is attached to the casing 22 by means of the circular fixed table 26 and the sleeve 28. The tank 24 has a substantially cylindrical shape whose diameter gradually increases upwardly from the bottom portion, and the opening at the upper end of the tank 24 is covered with a lid member 30. The lid member 30 is provided with an inlet 32 and a level meter 34. The powder particles are supplied to the tank 24 through the inlet 32 by entraining the particles in air and the amount of powder particles introduced into the tank 24 is detected by the level meter 34.

Mounted within the tank 24 in the lower portion thereof is a rotating body 36 which rotates about the center axis L of the tank 24 and the rotating body 36 includes a circular table 38. The table 38 is located directly above the circular fixed table 26 and has substantially the same diameter as the sleeve 28, and it substantially constitutes the bottom of the tank 24. The space between the table 38 and the sleeve 28 is sealed with a seal member 40. The circular table 38 will be hereinafter described in detail.

The rotating body 36 also includes a guide member 44 which extends along the axis L upwardly from the center portion of the table 38, and the guide member 44 is shaped into a substantially conical shape whose diameter gradually decreases upwardly. The rotating body 36 is attached to a shaft 46 disposed coaxially with the axis L. The shaft 46 extends downwardly from the rotating body 36 and protrudes into the casing 22. The shaft 46 is connected at its lower end to an electric motor 50 by means of an electromagnetic clutch 48. The upper end of the shaft 46 protrudes upwardly from the rotating body 36 and a rotating bar 52 is fixed to this end, whereby the rotating bar 52 rotates with the rotating body 36 caused by the rotation of the shaft 46.

The rotating bar 52 is provided for agitating the powder particles stored in the tank 24, and is especially used for the purpose of preventing blocking and caking of those powder particles which are disposed within the vicinity of in the upper region of the rotary table 38, and for obtaining uniform density of the powder particles. For this purpose, the rotating bar 52 is formed by bending a bar member and shaping it in such a way as to extend laterally from the upper portion of the shaft 46, downwardly toward the vicinity of the table 38 along the inclined side face 44a of the guide member 44, and upwardly along an inclined internal wall surface of the tank 24. The tank 24 is provided with a mounting hole for a vibrator 53 and a vibrator 53 can be mounted thereto as needed.

Figure 3:
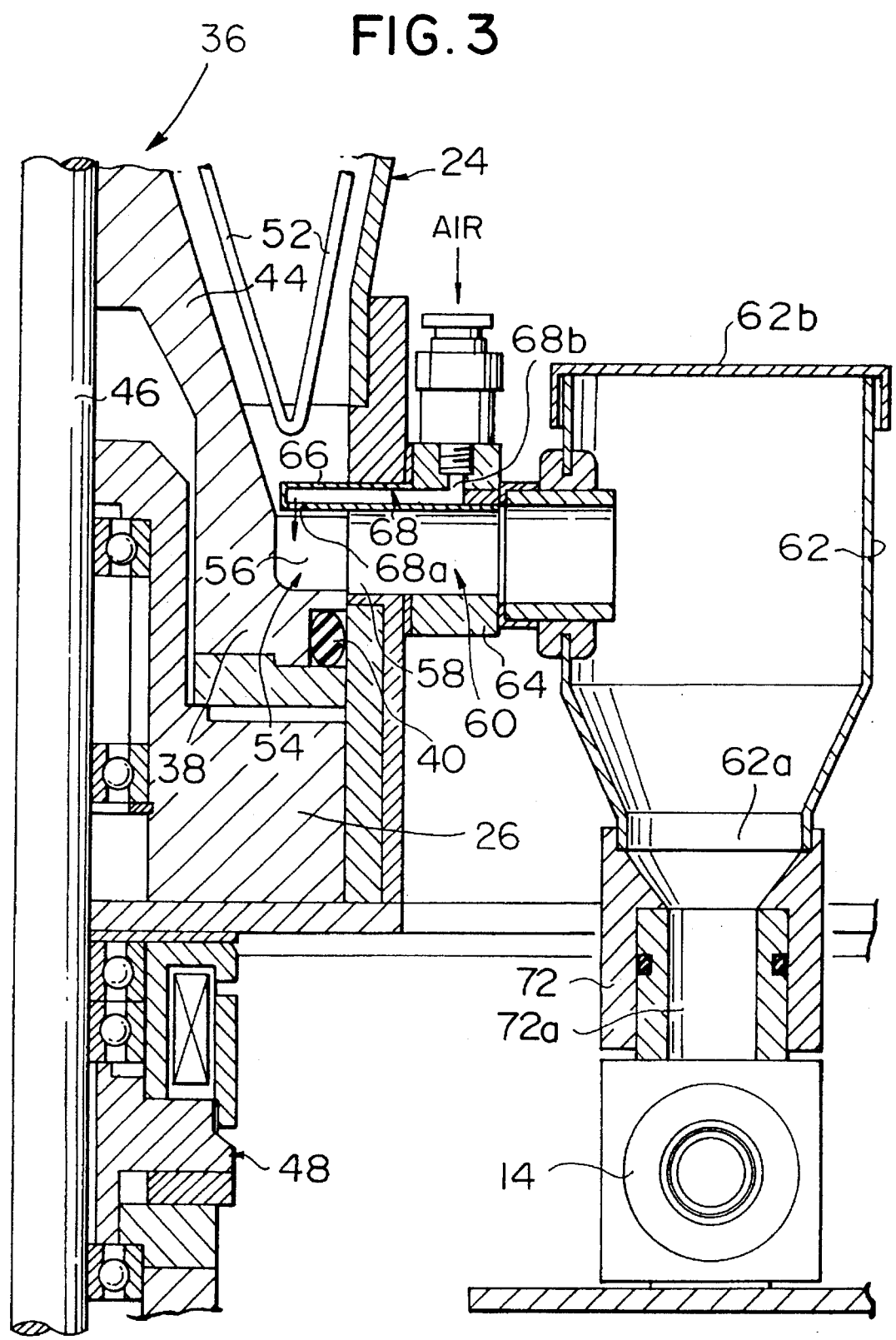
FIG. 3 is a partially enlarged cross-sectional view showing the vicinity of the outlet of the tank included in the constant amount powder supply apparatus.

The table 38 described above will be explained in detail with reference to FIGS. 3 and 4.

Figure 4:
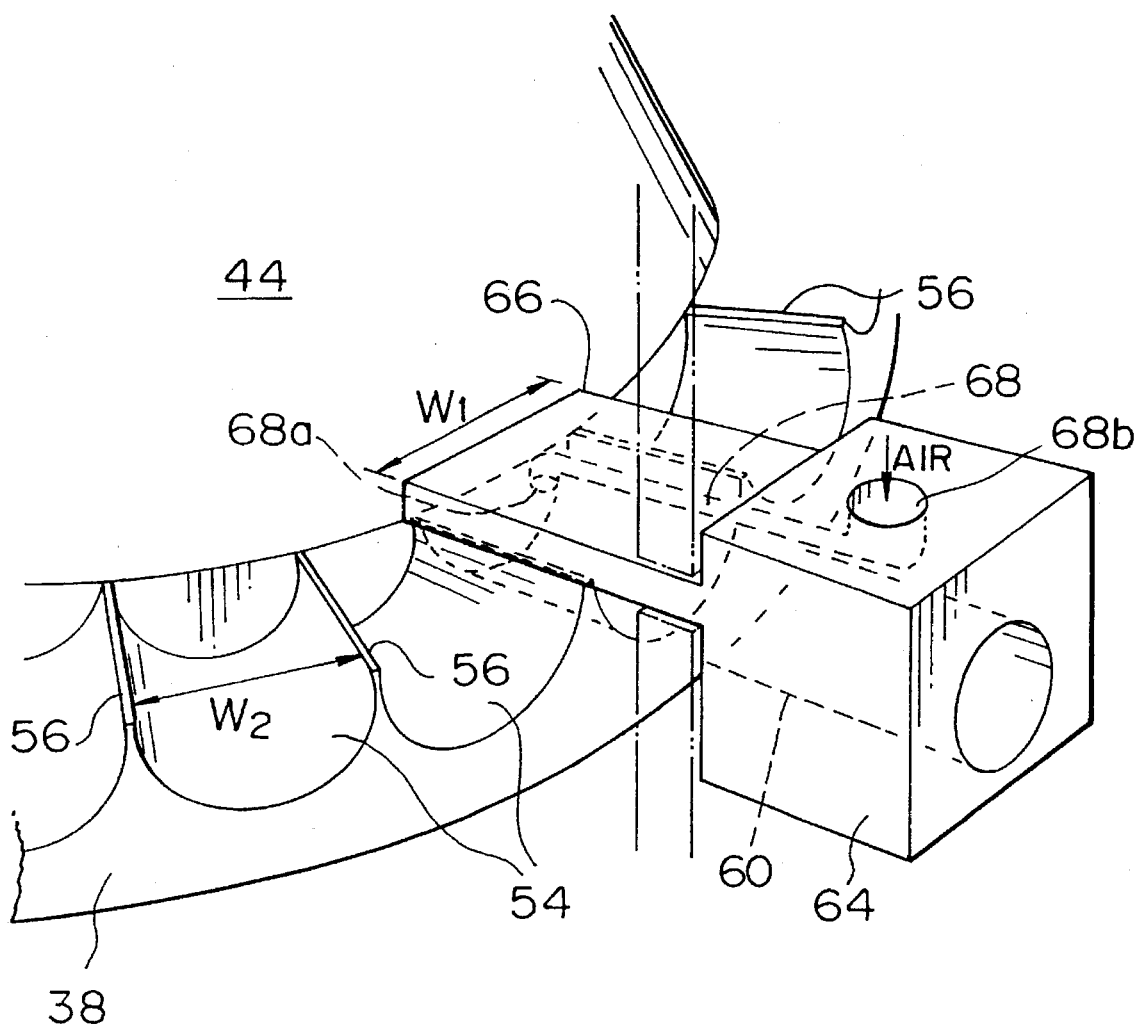
FIG. 4 is a partial perspective view showing the vicinity of the powder outlet of the tank included in the constant amount powder supply apparatus.

Note that, FIG. 4 illustrates a part of the rotating body 36, that is, a part of the table 38 and the guide member 44, for better understanding. As will be readily apparent from a viewing of FIG. 4, cavities 54 are formed on the upper face of the table 38 and at its outer peripheral portion. The cavities 54 extend radially and outwardly from the border of the guide member 44 to the outer peripheral surface of the table 38 on the upper face of the table 38 and form openings on the peripheral surface of the table 38. The plurality of cavities 54 are disposed next to each other in a circumferentially spaced manner and each cavity has the same volume. Vanes 56 are provided radially on the table 38 and are equally spaced circumferentially, whereby the plurality of cavities 54, each of which has the same volume, are formed by the vanes 56 located next to each other. The top edge of each vane 56 extends straight horizontally.

An outlet 58 is provided in the lower portion of the side wall of the tank 24, which is, in more detail, at the height which conforms to the height of the cavities 54. More than two outlets 58 spaced circumferentially from each other may be provided. The outlet 58 has substantially the same width as the cavities 54. A discharge passage 60 extends laterally from the outlet 58 and at its one end communicates with the outlet 58 and at the other end communicates within a chamber 62. The discharge passage 60 is formed with an intermediary member 64 disposed between the tank 24 and the chamber 62 and the intermediary member 64 includes a canopy 66 which comprises a flat panel and which protrudes into the tank 24 from the upper end of the outlet 58. The canopy 66 extends to a position close to the guide member 44 of the rotating body 36 at a height immediately above the upper end edges of the vanes 56. The width $W_1$ of the canopy 66 preferably has a larger dimension than the width $W_2$ of the cavities 54 (see FIG. 4).

The intermediary member 64 has an air passage 68 therein, which extends laterally from the inner end of the canopy 66 to the outside of the tank 24. The air passage 68 at its inner end communicates with an air ejection port 68a which has an opening facing downwardly, and at its outer end communicates with an air inlet port 68b extending upwardly. An air conduit (not shown) is connected with the air inlet port 68b and pressurized air from the air source which is also not shown, is supplied to the air passage 68 through the air conduit and the pressurized air is constantly discharged into the tank 24 through the port 68a. The arrow shown in FIG. 3 indicates the direction of the air flow. The amount of air ejected from the air ejection port 68a through the air passage 68 is adjusted by adjusting means (not shown).

The chamber 62 comprises a cylindrical body extending vertically and its lower end portion has a shape whose diameter gradually decreases downwardly. A lower end opening 62a of the chamber 62 is connected with the venturi mechanism 14 within the casing 22, that is, an injector, by means of a connecting member 72 provided with a passage 72a with a reduced diameter. A lid 62b of the chamber 62 is provided with an outlet which is not illustrated. The venturi mechanism 14 is conventionally known to be connected to the electrostatic coating gun 16 by means of a powder particle supply tube. The powder particle within the chamber 62 are sucked therethrough by means of negative pressure generated by delivering carrier air into the powder particle supply tube and the sucked powder particles are transported toward the gun 16. The amount of the carrier air flowing through the powder particle supply tube is adjusted by adjusting means (not shown). Several types of electrostatic coating guns 16, such as the corona discharge type or the triboelectrification type, are known and any one of them can be applied to the present invention, being selected in accordance with the purpose.

The controller or control panel 18 includes first control means for controlling the suction force of the venturi mechanism 14, second control means for controlling the rotational speed of the motor 50, manual switch means for controlling the electromagnetic clutch 40, means for setting the amount of powder particles to be delivered, and further includes display means for digitally displaying the set amount of powder particles to be delivered.

The operation of the electrostatic powder coating apparatus 10 described above will now be explained.

First, the powder pigments are deposited into the tank 24 up to the predetermined level. The rotating bar 52 is constantly rotated, whereby the powder particles within the tank 24 are agitated and by which their density becomes uniform. Rotation of the rotating bar 52 prevents caking and blocking of the powder particles located above the rotary table 38 and fills the cavities 54 of the rotary table 38 with the powder particles having a uniform density.

The powder particles within the cavities 54 advance in the direction of rotation as determined by the rotation of the rotary table 38. When they reach the location of canopy 66, the powder particles within the cavity 54 below the canopy 66 are separated from the powder particles thereabove, whereby amount of powder particles is measured. The powder particles within the cavity 54 covered by the canopy 66 are forced to be discharged from the outlet 58 toward the chamber 62 by the air constantly ejected from the air ejection port 68a. As described herein, since the powder particles are discharged while the cavity 54 is covered by the canopy 66, a constant amount of powder particles can be discharged regardless of the amount of powder particles contained within the tank 24, that is, the level of the powder particles therein.

The empty cavity 54 leaves the location of the canopy 66 as determined by the rotation of the rotary table 38 and it is again filled with powder particles by the downward flow of the powder particles within the tank 24. The smooth downward flow of the powder particles can be smoothly facilitated by the rotating body 36, that is, the guiding member 44, has a substantially conical shape which functions as a guide, the side wall of the tank 24 has a slope which functions as a guide, and/or the rotating bar 52 which functions as an agitator, whereby the density of the powder particles which fill the cavities 54 becomes uniform.

In order to prevent some powder particles within the cavity 54 under the canopy 66 from remaining therein, the corners of the side walls of the cavities 54 are preferably formed with a smooth curved surface. It is preferable to locate the air ejection port 68a at the far end portion, that is the radially inner end portion of the cavity 54 under the canopy and, if necessary, a plurality of air ejection ports 68a can be provided.

The powder particles which flow into the chamber 62 by air from the outlet 58 and through the discharge passage 60 travel downwardly within the chamber 62 while they are separated from air. They are then transported toward the coating gun 16 by suction generated by the venturi mechanism 14. To change the amount of powder particles to be discharged from the electrostatic coating gun 16, the number of revolutions of the driving motor 50 is changed so that the desired amount of particles to be discharged is obtained.

It is preferable to change the amount of particles to be discharged while the electromagnetic clutch 40 is turned off. Turning off the clutch 48 stops the rotation of the rotary table 38, whereby unnecessary discharge of the powder particles accompanied with the change in the amount of particles to be discharged can be prevented. Thus, the number of revolutions of the driving motor 50, that is the rotational speed of the rotary table 38, can be changed without unnecessarily discharging the powder pigment when the amount of powder particles to be discharged is substantially changed.

Figure 5:
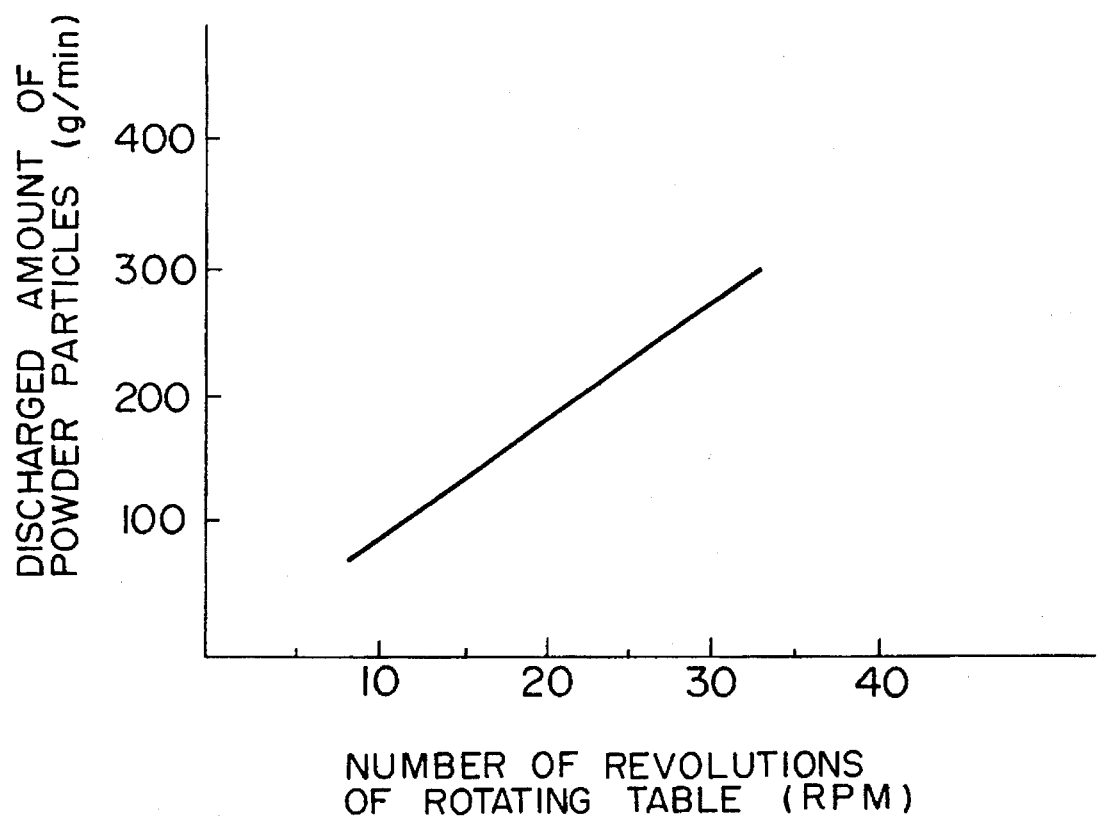
FIG. 5 is a gragh showing the relationship between the number of revolutions of the rotary table and the discharged amount of powder particles when the electrostatic powder coating apparatus according to the illustrated embodiment of the present invention is used.
Figure 6:
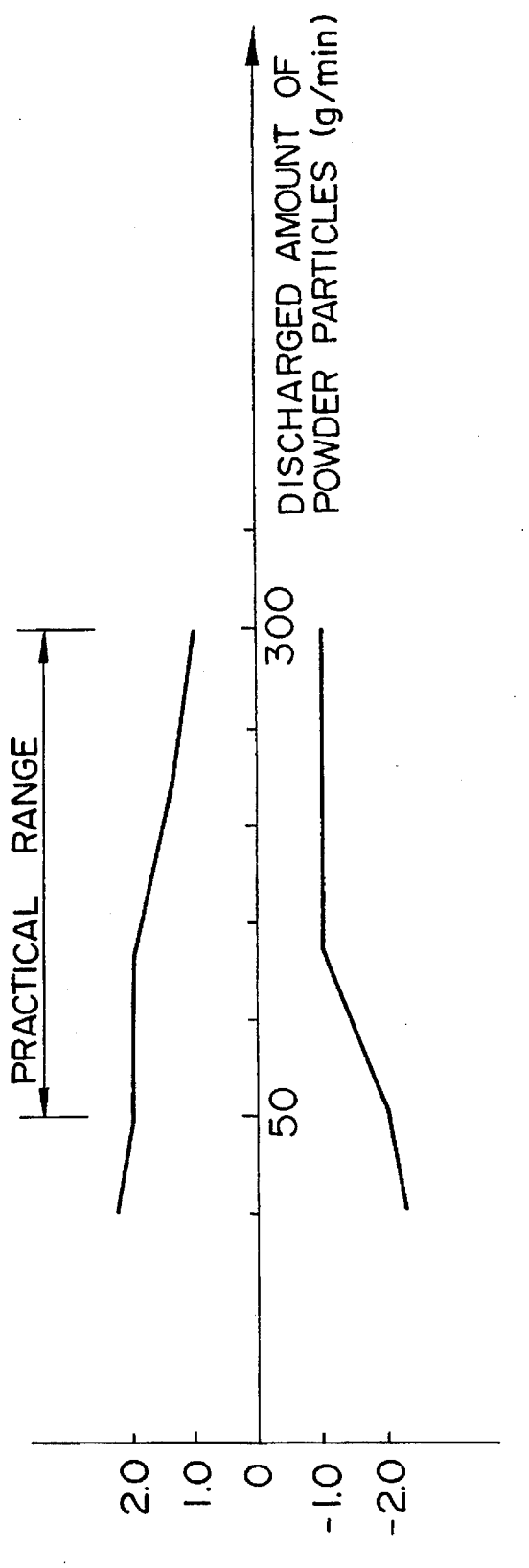
FIG. 6 is a graph showing the relationship between the discharged amount of powder particles and the accuracy of the discharged amount when the electrostatic powder coating apparatus according to the illustrated embodiment of the present invention is used.

By using the electrostatic coating apparatus 10, the relationship between the rotational speed of the rotary table 38 and the discharged amount of the coating gun 16 was tested. The results are shown in FIG. 5. Note that for this test, the coating gun 16 whose nozzle diameter is 0.5 mm and air pressure is 0.7 kg/cm$^2$ was used. As FIG. 5 clearly shows, the discharged amount of powder particles is proportional to the number of revolutions of the table 38. Therefore, it can be understood that the amount of powder supply discharged can be easily adjusted by controlling the rotational speed of the table 38. FIG. 6 shows the test results of the relationship between the discharged amount of powder particles and the accuracy of the discharged amount. As will be appreciated from FIG. 6, the accuracy of the discharged amount is within ±2% of the range of the practical discharged amount (50 g/min through 300 g/min) and it is satisfactory in practice. Now, the brief specification for the constant amount powder supply apparatus 12 used for this test is as follows:

The volume of the tank 24: approximately 1,300 cc

The diameter of the rotary table 38: approximately 80 mm

The diameter of the outlet 58: approximately 10 mm

The width $W_1$ of the canopy 66: approximately twice of the width of cavities 54

Figure 7:
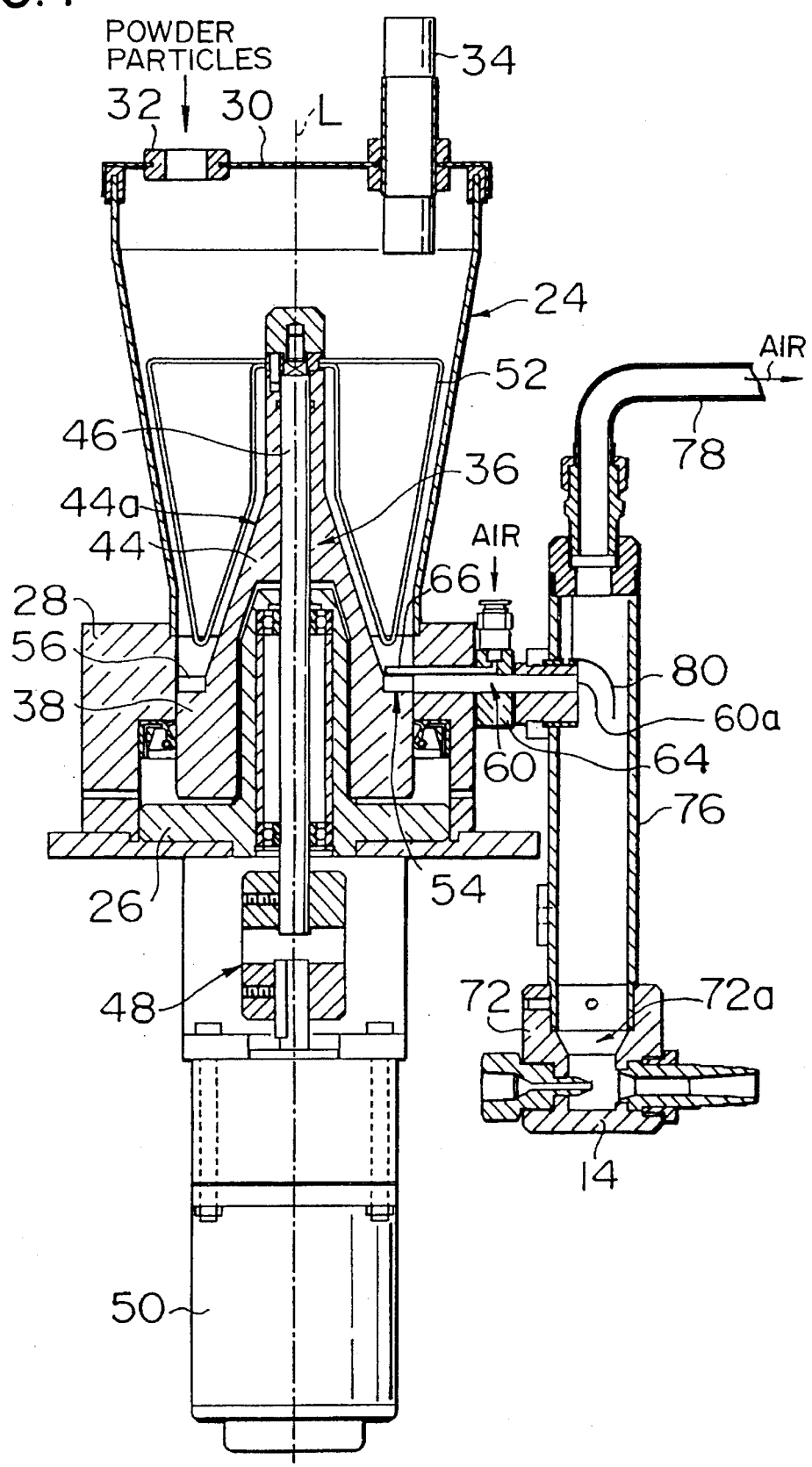
FIG. 7 is a vertical cross-sectional view of the powder particle constant amount supply apparatus according to the second illustrated embodiment of the present invention.
Figure 8:
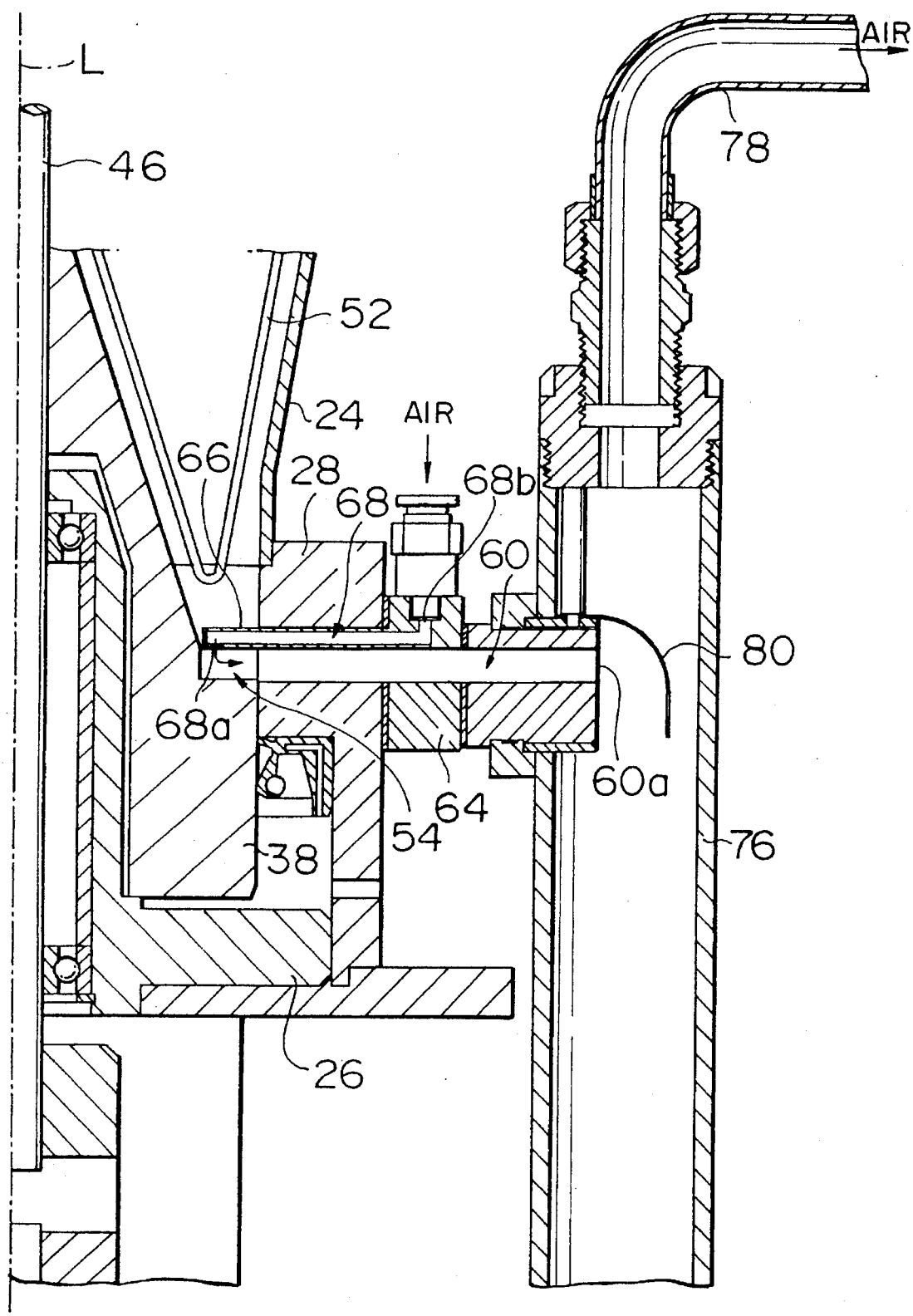
FIG. 8 is an enlarged cross-sectional view, similar to that of FIG. 3, showing the outlet vicinity of the powder particle constant amount supply apparatus shown in FIG. 7.

Second Embodiment (FIGS. 7 and 8)

FIGS. 7 and 8 show a second embodiment of the present invention. In the description of this embodiment, the description as to the same elements of the first embodiment is omitted but will be referenced with the same reference numbers as in the first embodiment, and the features of this embodiment will be hereinafter described.

In this embodiment, the intermediary member 64 connected to the tank 24 and the venturi mechanism 14 are connected to each other by a vertical pipe 76. As clearly shown in FIGS. 7 and 8, the vertical pipe 76 comprises a cylindrical body having a diameter relatively larger than that of the discharge passage 60. The vertical pipe 76 is connected at its upper end with an exhaust tube 78 and is connected at its lower end with the venturi mechanism 14 by means of a connecting member 72. The upper portion of the vertical pipe 76 is connected to the discharge passage 60 and a baffle plate 80 is disposed within an inner portion of the pipe 76 such that it is opposite an exit 60a of the discharge passage 60. The baffle plate 80 covers the upper region of the exit 60a of the discharge passage 60 and it has a curved shape which forces a change in the direction of the flow of the powder particles from the exit 60a downwardly toward the reduced passage 72a of the connencting member 72.

In accordance with this embodiment, separation of the powder particles from the air which flows out with the powder particles from the discharge passage 60 can be facilitated by the baffle plate 80 mounted within the vertical tube 76. Air separated by the baffle plate 80 is exhausted to the outside through the exhaust tube 78. The powder particles which flow out from the discharge passage 60 flow downwardly toward the venturi mechanism 14 without being blown directly against the vertical tube 76, thereby preventing the powder particles from adhering to the inner surface of the wall of the vertical tube 76.

While illustrated embodiments of the invention have been illustrated and described in detail, it will be apparent that various changes may be made in the disclosed embodiments without departing from the scope or sprit of the invention as determined by means of the appended claims.

What is claimed is:

1. A storetank for a powder supply, comprising:
   a tank, for storing powder particles, which has a substantially cylindrical side wall, a bottom portion, and an axis;
   a powder outlet, for discharging said powder particles, which is defined within the lower end portion of said side wall of said tank;
   a plurality of recesses, having substantially the same volume, defined upon a rotary member, rotatably disposed within said bottom portion of said tank, and equally spaced with respect to each other in a circumferential array about said axis of said tank;
   driving means for rotating said rotary member about said axis of said tank;

a canopy which extends substantially radially inwardly from said powder outlet and toward the inside of said tank so as to cover one of said plurality of recesses when said one of said plurality of recesses is disposed opposite said powder outlet and thereby define with said rotary member a substantially enclosed cavity containing a predetermined amount of said powder particles; and an air port which is defined within said tank for ejecting air toward said cavity disposed opposite said powder outlet so as to discharge said predetermined amount of said powder particles out from said substantially enclosed cavity and through said powder outlet.

2. The storetank in accordance with claim 1, wherein:

said rotary member comprises a rotary table disposed within said bottom portion of said tank and rotatably driven by said driving means about said axis of said tank; and said plurality of recesses are defined by a plurality of equiangularly, circumferentially spaced, radially oriented vanes defined upon said rotary table.

3. The storetank for powder supply in accordance with claim 2, wherein said vanes are integral with said rotary table.

4. The storetank in accordance with claim 3, wherein:

said plurality of vanes are disposed upon the outer peripheral portion of said rotary table so that said plurality of recesses, having said substantially equal volume, are formed thereon such that each one of said recesses opens upwardly at the outer circumference of said rotary table, and corners defined between said plurality of vanes and said rotary table are formed with curved surfaces.

5. The storetank for powder supply in accordance with claim 1, wherein said canopy is attached to said tank and said air ejection port is provided in said canopy.

6. The storetank in accordance with claim 5, wherein:

said canopy is provided with an air passage therein which is in fluidic communication with said air ejection port; and said air ejection port ejects compressed air, supplied through said air passage, toward the portion of said cavity which is located furthest away from said powder outlet so as to discharge said predetermined amount of said powder particles from said substantially enclosed cavity and through said powder outlet.

7. The storetank in accordance with claim 2, further comprising:

a substantially conical guide member, disposed coaxially within the inner lower portion of said tank, integrally connected to said rotary table, and having a sloped surface which extends outwardly and downwardly toward said rotary table so as to guide said powder particles toward said recesses defined upon said rotary table.

8. The storetank in accordance with claim 7, further comprising:

agitating means fixedly mounted upon said substantially conical guide member and disposed within said tank for agitating said powder particles within said tank.

9. The storetank as set forth in claim 8, wherein:

said agitating means comprises a bent bar member having a first major portion thereof extending along said sloped surface of said conical guide member, and a second major portion thereof extending along an internal surface of said substantially cylindrical sidewall of said tank.

10. Powder coating equipment, comprising:

a tank, for storing powder particles, which has a substantially cylindrical side wall, a bottom portion, and an axis;

a powder outlet, for discharging said powder particles, which is defined within the lower end portion of said side wall of said tank;

a plurality of recesses, having substantially the same volume, defined upon a rotary member, rotatably disposed within said bottom portion of said tank, and equally spaced with respect to each other in a circumferential array about said axis of said tank;

driving means for rotating said rotary member about said axis of said tank;

a canopy which extends substantially radially inwardly from said powder outlet and toward the inside of said tank so as to cover one of said plurality of recesses when said one of said plurality of recesses is disposed opposite said powder outlet and thereby define with said rotary member a substantially enclosed cavity containing a predetermined amount of said powder particles;

an air port which is defined within said tank for ejecting air toward said cavity disposed opposite said powder outlet so as to discharge said predetermined amount of said powder particles out from said substantially enclosed cavity and through said powder outlet;

a venturi mechanism for receiving said powder particles discharged from said powder outlet of said tank; and powder coating means, connected to said venturi mechanism, for discharging said powder particles, delivered by said venturi mechanism, toward an article to be coated.

11. The powder coating equipment in accordance with claim 10, wherein:

said rotary member comprises a rotary table disposed within said bottom portion of said tank and rotatably driven by said driving means about said axis of said tank; and said plurality of recesses are defined by a plurality of equiangularly, circumferentially spaced, radially oriented vanes defined upon said rotary table.

12. The powder coating equipment in accordance with claim 11, wherein said vanes are integral with said rotary table.

13. The powder coating equipment in accordance with claim 12, wherein:

said plurality of vanes are disposed upon the outer peripheral portion of said rotary table so that said plurality of recesses, having said substantially equal volume, are formed thereon such that each one of said recesses opens upwardly at the outer circumference of said rotary table, and corners defined between said plurality of vanes and said rotary table are formed with curved surfaces.

14. The powder coating equipment in accordance with claim 10, wherein said canopy is attached to said tank and said air ejection port is provided in said canopy.

15. The powder coating equipment in accordance with claim 14, wherein:

said canopy is provided with an air passage therein which is in fluidic communication with said air ejection port; and said air ejection port ejects compressed air, supplied through said air passage, toward the portion of said cavity which is located furthest away from said powder outlet so as to discharge said predetermined amount of said powder particles from said substantially enclosed cavity and through said powder outlet.

16. The powder coating equipment in accordance with claim 11, further comprising:

a substantially conical guide member, disposed coaxially within the inner lower portion of said tank, integrally connected to said rotary table, and having a sloped surface which extends outwardly and downwardly toward said rotary table so as to guide said powder particles toward said recesses defined upon said rotary table.

17. The powder coating equipment as set forth in claim 16, further comprising:

agitating means fixedly mounted upon said substantially conical guide member and disposed within said tank for agitating said powder particles within said tank.

18. The powder coating equipment as set forth in claim 17, wherein:

said agitating means comprises a bent bar member having a first major portion thereof extending along said sloped surface of said conical guide member, and a second major portion thereof extending along an internal surface of said substantially cylindrical sidewall of said tank.

19. A storetank for a powder supply, comprising:

a tank, for storing powder particles, which has a substantially cylindrical side wall, a bottom portion, and an axis;

a powder outlet, for discharging said powder particles, which is defined within the lower end portion of said side wall of said tank;

a rotary table, substantially defining said bottom portion of said tank, rotatable about said axis of said tank;

a plurality of radially extending, equiangularly circumferentially spaced vanes disposed Upon the outer peripheral portion of said rotary table so as to define a plurality of recesses disposed about the circumference of said rotary table wherein each recess has substantially the same volume and opens upwardly;

a substantially conical guide member, disposed coaxially within the inner lower portion of said tank, integrally connected to said rotary table, and having a sloped surface which extends outwardly and downwardly toward said rotatable so as to guide said powder particles toward said recesses defined upon said rotary table;

agitating means fixedly mounted upon said substantially conical guide member and disposed within said tank for agitating said powder particles within said tank;

a canopy fixedly attached to said tank and extending substantially radially inwardly from said powder outlet and toward the inside of said tank so as to cover one of said plurality of recesses when said one of said plurality of recesses is disposed opposite said powder outlet and thereby define with said rotary table a substantially enclosed cavity containing a predetermined amount of said powder particles;

an air passage defined within said canopy and in fluidic communication with a source of compressed air; and an air port defined within said canopy and in fluidic communication with said air passage for ejecting said compressed air toward the portion, of said cavity disposed opposite said powder outlet, which is located furthest away from said powder outlet so as to discharge said predetermined amount of said powder particles out from said substantially enclosed cavity and through said powder outlet.

20. The storetank as set forth in claim 19, wherein:

said agitating means comprises a bent bar member having a first major portion thereof extending along said sloped surface of said substantially conical guide member, and a second major portion thereof extending along an internal surface of said substantially cylindrical side wall of said tank.

* * * * *